P. DILLON & J. CLEARY,

Assignor to W. FARWELL.

Soldering Machine.

No. 9,479. Reissued Nov. 23, 1880.

WITNESSES -

L. F. Connor

V. D. Dearborn.

INVENTOR -

Peter Dillon & John Cleary by Crosby & Gregory Attys

N. PETERS, PHOTO-LITHOGRAPHER, WASHINGTON, D. C.

UNITED STATES PATENT OFFICE.

PETER DILLON AND JOHN CLEARY, OF SHERBROOKE, QUEBEC, CANADA
ASSIGNORS TO WILLIAM FARWELL, OF SAME PLACE.

SOLDERING-MACHINE.

SPECIFICATION forming part of Reissued Letters Patent No. 9,479, dated November 23, 1880.

Original No. 219,569, dated September 16, 1879. Application for reissue filed October 11, 1880.

*To all whom it may concern:*

Be it known that we, PETER DILLON and JOHN CLEARY, of the city of Sherbrooke, in the Province of Quebec and Dominion of Canada, have invented certain Improvements in Soldering-Machines, of which the following description, in connection with the accompanying drawings, is a specification.

This invention relates to improvements in soldering-machines to solder heads into can bodies or cylinders.

In this invention we employ an intermittingly-movable revolving carrier upon which is mounted a series of can-holders, each of which is lifted at the proper time to raise the can head and body in contact with the soldering-bolt, after which, while the can-head and end of the can are in contact with the soldering-bolt, the can-holder is automatically rotated, causing the soldering-bolt intermittingly supplied with solder to distribute and smooth the solder upon the seam to be soldered at the junction of the head and body.

Figure 2:
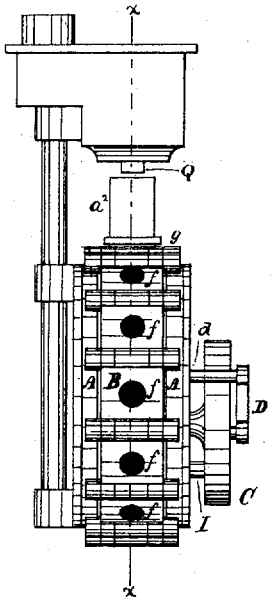
Figure 1:
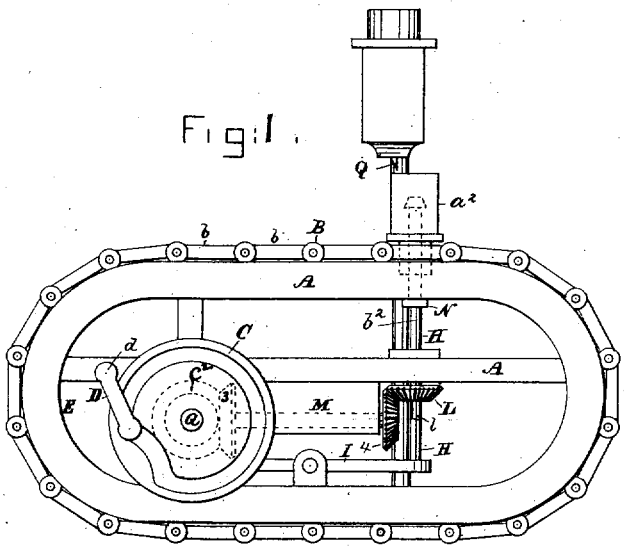
Figure 4:
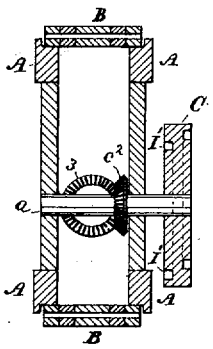
Figure 3:
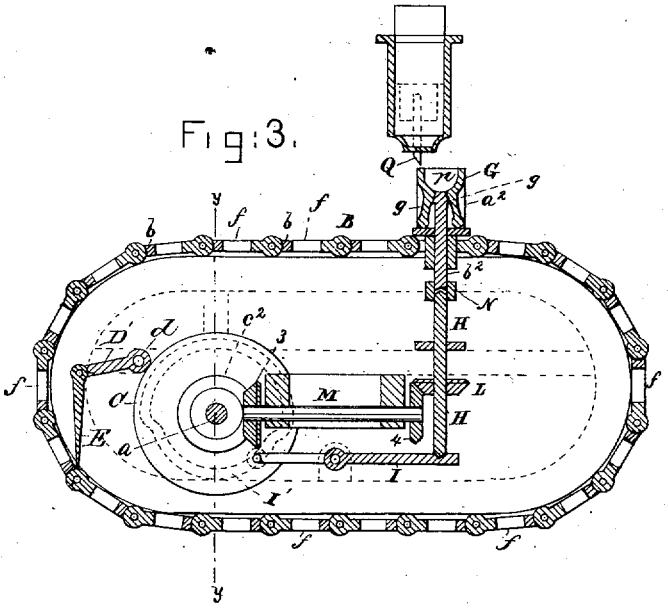

Figure 1 is a side elevation of a sufficient portion of a soldering apparatus to illustrate the intermittingly-movable revolving carrier, soldering-bolt, and means to rotate the can cylinder or body. Fig. 2 is an end elevation of Fig. 1; Fig. 3, a longitudinal vertical section on the line *x x*, Fig. 2, it showing the cam-wheel C and beveled gear $C^2$ in full lines; and Fig. 4 is a transverse vertical section on the line *y y*, Fig. 3.

A is the frame-work, which supports the intermittingly-movable revolving carrier B, which carries the can-holders G. The main or driven shaft *a*, supported in uprights of the frame-work, has fixed upon it the cam-wheel C, that operates the lever D attached to the rock-shaft *d*, having an arm, D′, provided with a pawl, E, which is designed to move the carrier intermittingly, the pawl acting against the links or connected plates of the carrier, as shown in Fig. 3. This carrier has a series of holes, *f*, each of which, in practice, will receive a can-holder, G, and connected spindle. Each can-holder is composed of jaws *g*, which are moved to engage and hold the can body or cylinder $a^2$ by means of the spindle $b^2$, the tapered upper end, *p*, of which acts upon the jaws, as in Fig. 3, pressing them outwardly in such manner as to tighten and hold the can-cylinder firmly in position on the spindle while the spindle is raised. The spindle $b^2$ is so supported or held as to be capable of having sufficient longitudinal movement to operate the jaws of the can-holder, the said spindle at its lower end being provided with a coupling or clutch device, N. The normal tendency of the spindle by its gravity is to drop and permit the jaws *g* to remain contracted ready for the reception or removal of a can-cylinder. Directly below and in line with spindle $b^2$ when the carrier is stationary and in proper position below the soldering-bolt Q is an upright shaft, H, suitably shaped at its upper end to engage the coupling N of the shaft $b^2$ and revolve it at the proper time.

The cam-wheel C, at its inner face, has a groove, I′, to receive and act upon a pin of the lifting-lever I, which serves as the step or support for the shaft H, and as the lever is moved the said shaft is raised and lowered. When the shaft is raised its upper end is made to engage the coupling or clutch device N of the spindle $b^2$, so that the said spindle, while so engaged, is made to rotate with the said shaft, and the shaft, as it is raised, also acts to lift the spindle $b^2$ to so operate the jaws of the can-holder as to grasp and hold the can-cylinder firmly, thus insuring the rotation of the can-cylinder with the can-holder and spindle and shaft.

The shaft *a* has upon it a bevel-gear, $C^2$, that, through the bevel-gear 3, shaft M, and bevel-gear 4, engages and rotates the bevel-gear L, feathered upon the shaft H at *l*, Fig. 1, so as to rotate the said shaft H continuously with the gear L as it is rotated. This feather-connection permits the shaft to be raised and lowered with relation to the said gear L while it is being rotated.

There is attached to the frame a gas-generator with solder-bath and solder-bolt Q, arranged in such manner that the solder-bolt is immediately above the edge of the can-holder, as in Figs. 1 and 3, as the spindle $b^2$ arrives in proper position above the shaft H. Each can-holder, as it approaches the soldering apparatus, is supplied with a can-cylinder, the piece of tin to form the head of the can being placed in position ready to be soldered in the cylinder. The carrier, with a can and head upon the can-holder, having arrived in proper position under the soldering apparatus, the vertical shaft H is raised and engaged with the spindle, raising it to press outwardly the jaws of the can-holder, so as to grasp the can-cylinder firmly. The cylinder so grasped and rotated is lifted until the head for the can-cylinder is brought against the point of the soldering-bolt, which at the same movement discharges a sufficient quantity of molten solder upon the edge of the head and cylinder, and as the rotation of the can-holder with the can and head in contact with the soldering-bolt is continued the latter distributes and smooths the solder upon the seam between the head and cylinder, and after one or more revolutions of the cylinder the shaft and spindle are disconnected, the can-holder and can are permitted to descend, and then the pawl E acts upon and moves the carrier another step forward to bring another can-holder and operating-spindle with another can-cylinder and head into position, when the same operation is repeated.

The can-holders are made to grasp and release the can-cylinder automatically, and they act upon the can-cylinder near its upper end to steady it, which is quite essential in order to keep the can end closely in contact with the solder-bolt without bending the tin or tripping the can-cylinder.

In a patent heretofore granted to us a can to have a bottom soldered in it has been held by springs at the upper end of an inclined shaft, the said shaft and clamp being mounted upon a vertically-movable carriage.

We do not claim a hand-operated revolving platform containing disks or plates upon which cans are set and turned while being sealed.

We claim—

1. In a machine to solder heads into can-cylinders, a revolving carrier, a series of can-holders thereon to grasp and hold the can-cylinders, the can-holders having downwardly-extended spindles, a shaft and means to operate it continuously, a clutch between the said spindle and rotating shaft, and means to engage the said clutch to connect the spindle and shaft to rotate the holders, combined with a solder bath and bolt therein, whereby molten solder may be deposited upon the can-head, after which the solder-bolt smooths the same on the seam at the junction of the head and upper end of the can, substantially as described.

2. In a machine to solder heads into can-cylinders, a can-holder to grasp the can, and a spindle connected therewith provided with a coupling or clutch combined with a shaft shaped at one end to engage the coupling of the spindle, and with means to both lift the shaft vertically to engage the coupling of the spindle and to rotate the said spindle, the latter carrying with it the can-holder and rotating the can-cylinder, substantially as described.

3. In a soldering-machine, the combination of an endless chain-carrier or series of links, each having a spindle to serve as holders for cylinders, with the pawl E, lever D, and cam-wheel C, substantially as described.

4. An endless chain-carrier or series of links, each having a spindle-holder for cylinders, worked by the pawl E, lever D, and cam-wheel C, in combination with a soldering apparatus, substantially as described.

5. The spindle G, having internal gripes, *g g*, shaft O, with its beveled end *p*, in combination with the shaft H, lever I, and cam-wheel C, main shaft *a*, with the gear-wheels $C^2$ 3 4 L, and shaft M, whereby the spindle G is caused to rotate under the soldering-bolt Q, substantially as and for the purpose described.

PETER DILLON.
JOHN CLEARY.

Witnesses:
H. A. ELKINS,
E. PELLEW FELTON.